United States Patent [19]

Marwick

[11] Patent Number: 4,892,599

[45] Date of Patent: Jan. 9, 1990

[54] JOINING METAL COMPONENTS

[75] Inventor: William F. Marwick, Daventry, England

[73] Assignee: Alcan International Limited, Montreal, Canada

[21] Appl. No.: 250,909

[22] Filed: Sep. 29, 1988

[30] Foreign Application Priority Data

Oct. 7, 1987 [GB] United Kingdom ............... 8723565

[51] Int. Cl.$^4$ ............................................. B32B 35/00
[52] U.S. Cl. .................................. 156/94; 29/402.09; 29/402.18; 156/275.3; 156/275.7; 156/280; 427/55; 427/56.1; 427/142; 428/63
[58] Field of Search .................... 156/94, 275.3, 275.7, 156/280; 427/55, 56.1, 142; 29/402.09, 402.18; 428/63

[56] References Cited

U.S. PATENT DOCUMENTS

| | | | |
|---|---|---|---|
| 4,464,220 | 8/1984 | Beer | 156/275.7 X |
| 4,525,380 | 6/1985 | Arai et al. | 427/55 X |
| 4,535,548 | 8/1985 | Hyde | 427/55 X |

Primary Examiner—Robert A. Dawson
Attorney, Agent, or Firm—Cooper & Dunham

[57] ABSTRACT

A method for the repair of an aluminium metal structure that has been damaged involves applying a heat-curable adhesive between faying surfaces of components and curing the adhesive by means of infra-red radiation. An infra-red absorbing coating, such as a black lacquer, is applied to an exterior surface of the structure to be heated, and is effective to confine heat supplied to the desired region and to avoid overheating, both of the infra red lamps and the remainder of the structure.

6 Claims, No Drawings

JOINING METAL COMPONENTS

This invention is concerned with a method of joining components of a metal structure. Although the method is of general application, it was originally developed to repair pre-formed structures that had been damaged, such as the load-bearing adhesively bonded aluminium metal structures that are increasingly being proposed for use in motor vehicles.

Repair procedures have been devised which employ ambient-cure two-part adhesives in the repair of damaged steel body-panels in automobiles. However, these adhesive repairs do not have to sustain large stresses. There is a need for means to repair aluminium structures by means of adhesive which has to sustain a variety of loading modes of substantial magnitude in adverse environmental conditions. In these circumstances the ambient-cure adhesives suffer from creep failures, as a result of the plasticising effect of water and/or elevated temperature. No reformulating of ambient-cure adhesives can alleviate this problem, because it arises from the reduced cross-linking density of an ambient-cured material.

This invention involves the use of heat-curable adhesives, which can in principle provide stronger adhesive bonds. The problem remains of how to apply heat to the adhesive in situ so as to effect a cure. Various procedures are available:

The entire structure can be placed in an oven. One difficulty with this is that the structure may be too large to fit in the oven. Another difficulty is that this approach necessarily involves heating the whole structure, and the heat may damage other parts which may include, for example, pre-formed adhesive bonds or electrical wiring harnesses or thermoplastic fittings.

Blow hot air at the region including the adhesive to be cured. A problem with this approach is heat transfer; particularly in an aluminium structure, maintenance of a local high temperature requires a high heat input to counter the rapid heat loss by conduction.

Contact heating. A variety of flexible thermal pads and bandages are available, but the technique requires careful clamping and fixing of the heaters to ensure as good a contact as possible. This technique is difficult where the repair area covers a complex three-dimensional shape, or where access from both sides is not possible.

Infra-red radiant heating. This technique can supply sufficient heat input to counter the rapid heat loss by conduction. A problem arises from the reflectivity of the metal, e.g. aluminium, surface. This may reduce heat absorption by the metal, or may cause infra-red lamps to overheat and soldered connections to fuse.

This invention involves the use of heating by infra-red radiation, and provides a method of overcoming the above problems. According to the invention, a method of joining components of a metal structure comprises applying a heat-curable adhesive between faying surfaces of the components, applying an infra-red absorbing coating to an exterior surface of the structure in the vicinity of the adhesive, and curing the adhesive by applying infra-red radiation to the coated surface. The adhesive is cured by means of heat conducted from the coated surface. Several advantages arise from the use of an infra-red absorbing coating in this way:

Reflection is reduced, thus avoiding the problems of causing infra-red lamps to overheat and soldered connections to fuse. In general, the longevity of infra-red lamps is guaranteed only if they are kept cool.

Heat transfer efficiency to the metal underlying the infra-red absorbing coating is improved. As a result, fewer or smaller lamps can be used, with resulting saving in both capital and running costs.

There is a bigger temperature gradient than would otherwise arise, between the parts of the structure underlying the infra-red absorbing coating and the remaining parts of the structure. This avoids damage to the remaining parts of the structure, and also reduces the heat input required to cure the adhesive.

As to the nature of the metal, the invention is of general application. As noted above, the method is however likely to be particularly useful when the components are of aluminium, which term is here used to encompass the pure metal and aluminium-rich alloys. The state of the metal surfaces to which the adhesive and the coating are applied are not critical. For example, in the case of aluminium, the surfaces may have been subjected to a pre-treatment such as those described in our European Patent Applications 127343 and 181168. And surfaces so pretreated may have been protected by means of a strippable lacquer, for example as described in our European Patent Application 225691.

The nature of the adhesive is not critical. A number of suitable adhesives are available commercially, such as that marketed under the Trade Mark XB7265 (3M Co. Ltd., Gorseinon, Swansea), which cures at 120° C. after less than one hour. It is easily possible to tell by routine testing whether an adhesive is suitable in a particular environment or not.

The coating is chosen to absorb infra-red radiation considerably better than the metal surface to which it is applied. It should preferably be formulated to be stable to the heat required to cure the adhesive. Acrylic resins that are thermally stable may be used in formulating a black lacquer so as to ensure that the lacquer can be easily removed with solvent when the repair is complete. Pure acrylic lacquers have the advantage of not decomposing or smoking or evolving noxious fumes at the high surface temperatures involved.

The coating may be organic applied as a lacquer or as a powder and stoved, or it may be inorganic formed by anodizing and then dyeing with an organic dye or by electrolytic colouring.

The coating will generally be dark-coloured, so as to increase absorption of radiant heat, but does not need to be precisely black. It may be a lacquer comprising a solution or dispersion of dark-coloured material in a, generally organic, binder. It may be formulated with a matt finish to improve absorption of infra-red radiation. For example, carbon black such as furnace black may be incorporated in an acrylic resin binder. The thickness of the coating is not critical, provided that it is effective to increase absorption of infra-red radiation. The coating is generally applied only to those surfaces facing the infra-red lamp or lamps which are to be heated; surfaces that are not required to be heated, or that need to be kept relatively cool, are left uncoated.

The following Examples illustrate the invention.

EXAMPLE 1

The following test demonstrates the temperature difference that can be achieved by applying a black lacquer.

The test piece was a symmetrical aluminium alloy structure consisting of a 1.6 mm thick "repair patch" covering an adhered 1.6 mm thick "damage area". The adhesive was that sold under the Trade Mark XB7265. The left hand side of the repair patch was painted with a black lacquer, the right hand side being in its normal as-rolled finish. The lacquer was formulated as follows:
Paraloid AT 75 (Rohm & Haas U.K. Ltd.)—80
Furnace black pigment—20.

This lacquer was applied by brush and allowed to dry at room temperature. The repair patch was exposed uniformly to infra-red radiation from a 1 kW medium wavelength I.R. tube. The area of irradiation was 200×600 mm. The temperature of the adhesive layer under the repair patch was monitored with platinum resistance thermocouples, and the equilibrium temperatures were recorded as follows:
under the as-rolled metal—110° C.
under the black-painted metal—145° C.

EXAMPLE 2

This Example provides comparative data on sets of single lap adhesive joints which were cured in the conventional way in a convecting air oven at 160° C. for thirty minutes, and also at the same temperature for thirty minutes under irradiation from one side only. The issue here is that the mechanism of conventional oven heating ensures that the adherend heats up first and heats the adhesive subsequently; at no time does the adhesive have to bond to an adherend which is at a lower temperature than the adhesive itself. Irradiation of an adhesive joint from one side, however, imposes this condition on the adhesive. It warms up by conduction from the irradiated side and then has to heat up the adherend which is not irradiated. (It is clear that most repairs cannot be irradiated from both sides, as access will most often only be available on one side). The initial strength, and durability in neutral salt spray, of adhesive joints cured by these two methods are set out in the table below. The failure stresses tabulated are those sustained by a single lap joint made with 1.6 mm thick aluminium with an overlap area of 200 mm². The same black lacquer was used as in Example 1.

| Adhesive | Cure | Temp. °C. | Time mins. | Initial Strength MPa | Final Strength* MPa |
|---|---|---|---|---|---|
| A | I.R. | 160 | 30 | 18.6 | 17.8 |
| B | I.R. | 160 | 30 | 19.0 | 19.8 |
| A | oven | 160 | 30 | 20.5 | 20.7 |
| B | oven | 160 | 30 | 20.5 | 21.5 |

*After twenty weeks exposure to neutral salt spray at 43° C.

EXAMPLE 3

A damaged vehicle was stretched to shape on a Blackhawk jig. The crumpled box-section of the damaged vehicle was cut away. Suitable pieces of aluminium were cut to fit into the box section and span the damaged area. The pieces were fitted in with single pack epoxy adhesive and rivetted. The exterior face of the structure corresponding to the repair zone was laquered black. Heat sensitive brake pipes were shielded by foil. The repair was cured for 30 minutes at 150° C. by heating with two 1 kW IR lamps. The repair was fully effective.

I claim:

1. A method of joining components of a metal structure, which method comprises applying a heat-curable adhesive between faying surfaces of the components, applying an infra-red absorbing coating to an exterior surface of the structure in the vicinity of the adhesive, and curing the adhesive by applying infra-red radiation to the coated surface.

2. A method as claimed in claim 1, wherein the components are of aluminium.

3. A method as claimed in claim 1, when used for the repair of a pre-formed structure that has been damaged.

4. A method as claimed in claim 1, wherein the structure is a load-bearing adhesively bonded structure of aluminium forming part of a motor vehicle.

5. A method as claimed in claim 1, wherein the infra-red absorbing coating is a black lacquer based on an acrylic resin.

6. A method as claimed in claim 1, wherein the infra-red absorbing coating is applied to only part of the exterior surface of the structure, surrounding parts of the surface being left uncoated.

* * * * *